(No Model.)

M. E. HASTINGS.
BEE FEEDER.

No. 371,581. Patented Oct. 18, 1887.

Witnesses:
Edwin H. Risley
E. L. Hunt

Inventor:
M. E. Hastings
By Risley Luin & Perry
attys

United States Patent Office.

MATTHEW EMERY HASTINGS, OF NEW YORK MILLS, NEW YORK.

BEE-FEEDER.

SPECIFICATION forming part of Letters Patent No. 371,581, dated October 18, 1887.

Application filed November 6, 1886. Serial No. 218,197. (No model.)

*To all whom it may concern:*

Be it known that I, MATTHEW EMERY HASTINGS, of New York Mills, in the county of Oneida and State of New York, have invented certain new and useful Improvements in Bee-Feeders; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a bee-feeder; and it consists in the mechanism hereinafter set forth and claimed.

Figure 1:
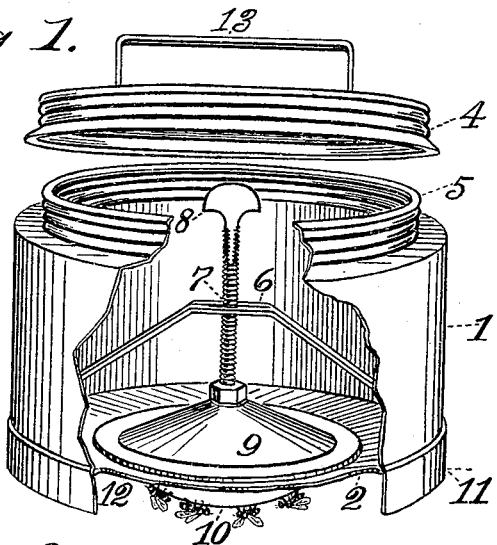
Figure 2:
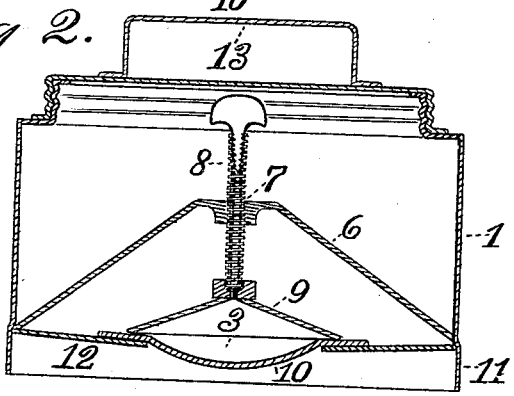
Figure 3:
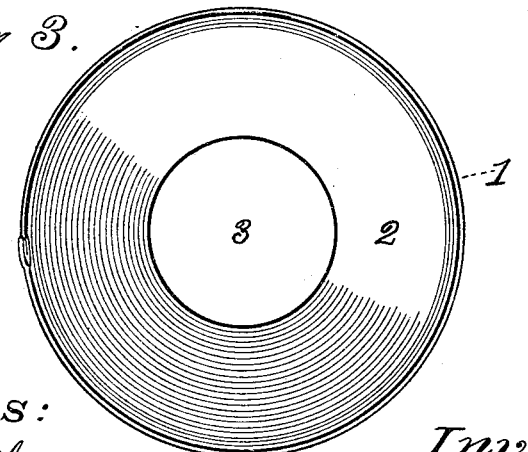

In the accompanying drawings, Figure 1 represents a perspective view of my bee-feeder, the broken lines indicating the portion removed. Fig. 2 is a vertical central section of the frame. Fig. 3 is a bottom view of the same.

Heretofore various devices have been constructed for feeding sirup, glucose, or honey to bees, which have been more or less successful.

So far as I am aware, my invention is a radical departure from devices heretofore constructed for the same purpose.

I provide a reservoir, I, preferably constructed of tin, of the required size and shape, having bottom 2, with central hole or perforation, 3, in the bottom, through which the sirup, glucose, or honey passes. I close the reservoir at its top by screw-threaded cap 4, fitting on the screw-threaded collar 5, provided at the top of the reservoir. This particular construction, however, may be changed or modified without departing from the spirit of my invention. I provide in the interior of the reservoir an arched brace, 6, its extremities being rigidly attached to the walls of the reservoir, or to its bottom, as shown in Fig. 2. In the center of this arched brace I provide a screw-threaded opening, 7, into which is fitted thumb-screw 8, which carries at its lower end a conical presser-plate, 9, the base being of sufficient size to lap over opening 3 in the bottom of the reservoir. The purpose of this arched brace, thumb screw, and presser-plate is to press the sirup, glucose, or honey contained in the reservoir through a flannel or felt strainer, 10, covering opening 3 in the bottom of the reservoir, and for regulating the flow of material through the strainer to the lower surface of the same.

I preferably provide at the bottom of the reservoir, surrounding the same, an extension-flange, 11, forming a chamber, 12, surrounding the strainer and opening in the bottom of the reservoir, into which the bees pass from an opening in the hive, where they are fed from the sirup, glucose, or honey, from the under side of the strainer, as shown in Fig. 1. 13 represents the handle on the cap.

What I claim as new, and desire to secure by Letters Patent, is—

1. The combination of a reservoir, having an opening in the bottom, with the strainer covering the opening, and the presser-plate and screw for operating the same.

2. The combination of the reservoir with opening in the bottom, the strainer covering the opening, the brace in the reservoir, and the screw and presser-plate, operated substantially as set forth, for the purposes stated.

3. The combination, with the reservoir having an opening in the bottom, the strainer covering the opening, the conical swiveled presser-plate, and the screw for operating the same, of the flange below the bottom surrounding the opening forming a chamber.

In witness whereof I have affixed my signature in presence of two witnesses.

MATTHEW EMERY HASTINGS.

Witnesses:
EDWIN H. RISLEY,
W. STUART WALCOTT.